July 20, 1954 — H. T. MYLOR — 2,684,185
SPREADER FOR PARTICULATE MATERIAL
Filed Aug. 11, 1950
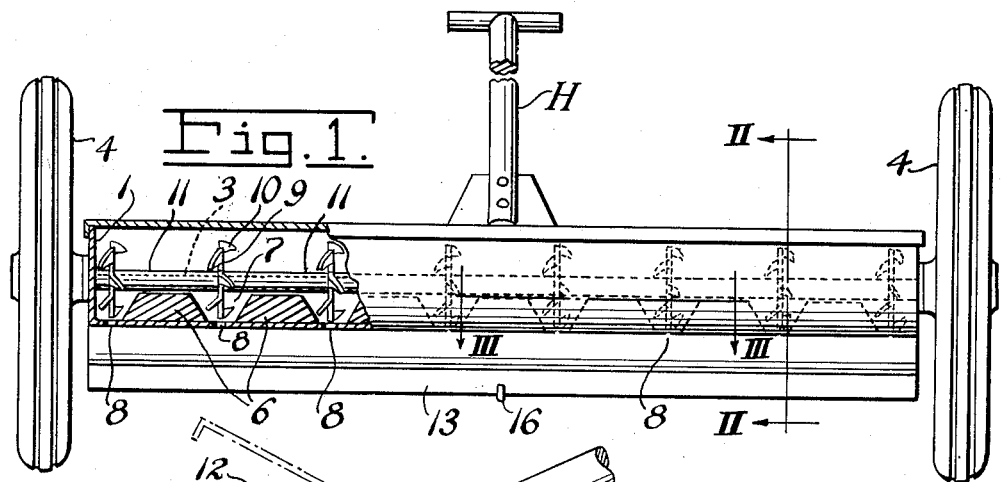
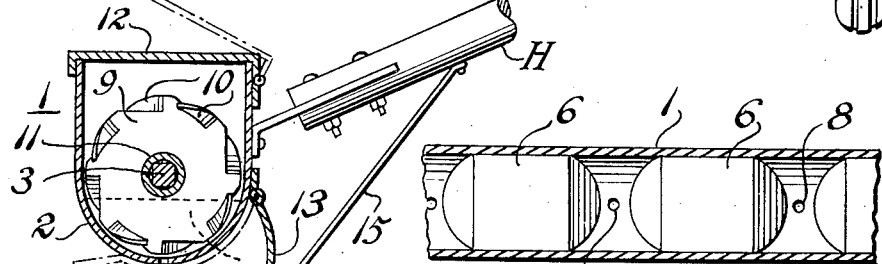
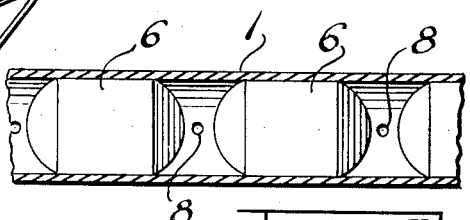
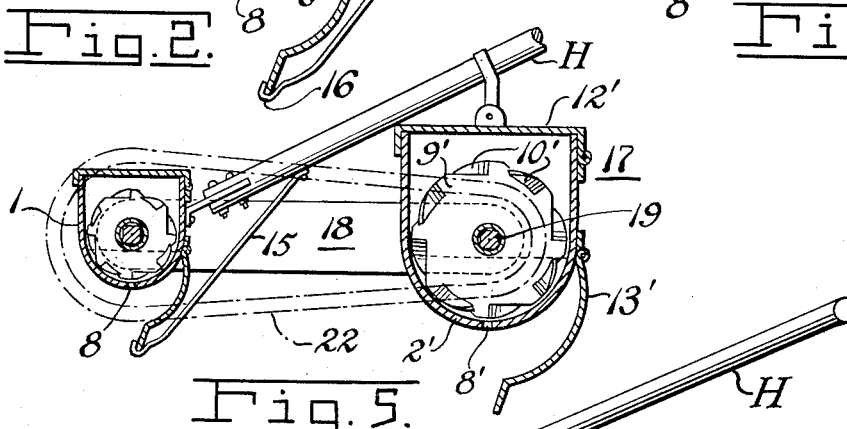
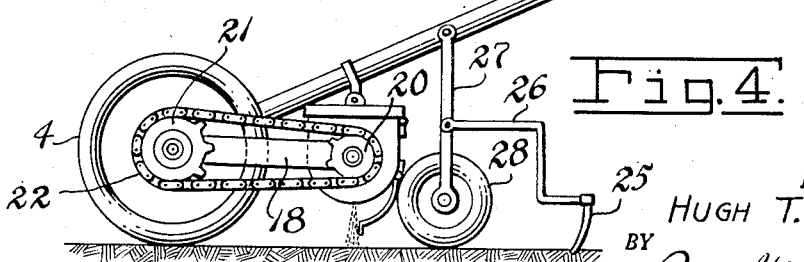
INVENTOR.
HUGH T. MYLOR
BY
Zugelter & Zugelter
Attys.

Patented July 20, 1954

2,684,185

UNITED STATES PATENT OFFICE 2,684,185

SPREADER FOR PARTICULATE MATERIAL

Hugh T. Mylor, Carrollton, Ky.

Application August 11, 1950, Serial No. 178,890

1 Claim. (Cl. 222—177)

This invention relates to spreading devices for finely divided particulate material, such as fine seed, and more particularly, to tobacco seeders.

An object of this invention is to provide a device that is particularly designed to spread fine seed, such as tobacco seed, and so constructed that the seeds may be deposited uniformly on a tobacco seed-bed with a minimum loss of seed.

The above and other objects of the invention will in part be apparent from the following description and the accompanying drawings, in which:

Figure 1 is a view in front elevation of a device embodying a form of the invention;

Fig. 2 is a view in section, taken on line II—II of Fig. 1;

Fig. 3 is a partial view in section, taken on line III—III of Fig. 1;

Fig. 4 is a view in side elevation, of a device such as shown in Fig. 1, provided with a fertilizer spreader and means for raking the seed and fertilizer into the ground as the same are deposited thereon; and Fig. 5 is a view in section, corresponding to the section taken on line II—II of Fig. 1, of the device shown in Fig. 5.

Throughout the drawings and specification, like reference characters indicate like parts.

In Fig. 1 of the drawings a spreader of particulate material such as tobacco seed, for example, or other seed of small particle size, is shown. The seeder comprises a trough-like member 1 of substantially U-shape in transverse section and having a substantially semi-cylindrical bottom portion 2. A shaft 3 extends through the closed ends of the trough-like member 1 longitudinally thereof with the opposite ends thereof extending beyond the trough-like member on which wheels 4 are mounted. The longitudinal axis of the shaft is substantially at the center of the semi-circular bottom portion 2. Wheels 4 are secured to shaft 3 so that the shaft will rotate with the turning of the wheels. A handle H is secured to the rear wall of member 1 whereby the device may be propelled over the seed bed or ground.

Along the bottom of the trough-like member 1 are secured a plurality of spaced blocks 5, the adjacent ends of which slope downwardly in a converging direction so as to form truncated V-shaped spaces 7 therebetween. The bottom portion 2 of the trough-like member is perforated at approximately the center of the truncated V-shaped spaces 7 to provide openings 8 through which tobacco seed and the like may be discharged.

In order to insure uniform discharge of tobacco seed and the like through the openings 8, a plurality of agitating and feeding members 9 are mounted on and secured to shaft 1. As shown in Fig. 1, an agitating and feeding member 9 is provided for each space 7. As shown, each agitating and feeding member 9 comprises a circular disk provided with lugs 10 at the periphery thereof that project laterally from the body of the disk as shown. In a preferred form of agitating and feeding member 9, lugs 10 project alternately from opposite sides of the disk, whereby substantially the larger part of the width of each space 7 is swept through by members 9 as the shaft 3 rotates.

As shown in Fig. 2, the shaft 3 is square in section and disks 9 are provided with square holes at the center. Thus, when the disks are slipped onto the shaft they will turn with the shaft. Disks 9 are maintained in their proper positions in spaced relation to each other by short tube sections 11 that are slipped onto the shaft and located between the disks.

The trough-like member is provided with a hinged cover 12 for closing the top thereof.

In order that the feed openings 8 may be closed when the device is not in operation for spreading seed or other particulate material, and also to provide means for preventing seed from blowing away when the seeder is in operation, a hinged cover and guard member 13 is provided. As shown, member 13 is hinged along its upper edge on the rear side of the trough-like member 1. When the device is in operation spreading seed, for example, cover 13 is swung to a position indicated by the full lines in Fig. 2, in which position it is held by a stay 15 having a retaining hook 16, at its free end for receiving the free edge of member 13. When the member 13 is swung to the dotted line position shown in Fig. 2, the feed openings 8 are closed.

In a preferred form of the invention, wheels 4 are of the disk type, therefore, by employing wheels of the disk type and a cover and guard such as member 13, fine, light seed, such as tobacco seed, is protected from the wind. If the wind is from the rear or the sides, the member 13 and the disk wheels serve as a wind-break. If the wind is blowing towards the front of the seeder, the seed will strike the guard 13 and be directed into the ground.

In Figs. 4 and 5 there is shown a device similar to the device of Figs. 1, 2 and 3, which is modified to provide for simultaneously seeding and fertilizing a seed-bed. As shown in Fig. 5, the seed distributor is located as in Figs. 1 and 2 and the fertilizer spreader or distributor 17 is located rearwardly of the same. In the device shown in Figs. 4 and 5, the shaft on which the wheels 4 are mounted, extends outwardly of the ends of the seed trough 1 sufficiently to accommodate side members 18 through which a shaft 19 corresponding in location and function to shaft 3, extends. On one end of shaft 19 is a sprocket 20 and on the corresponding end of shaft 3 of the seed spreader is a sprocket 21 over which a sprocket chain 22 runs. Thus, as the device is pushed over the seed-bed the fertilizer spreader is driven simultaneously with the seed spreader by wheels 4 and the sprockets 20 and 21 and the sprocket chain 22.

As fertilizer spreader 17 is similar in construction to the seed spreader except that the dimensions thereof are larger, parts of the fertilizer spreader 17 that are similar in function and construction to parts of the seed spreader are designated by the same reference characters with primes affixed.

The forms of device shown in Figs. 1 and 2, and Figs. 4 and 5, may each be provided with a rake 25 that trails either the seed spreader or the fertilizer spreader and rakes the ground thereby raking the seed, the fertilizer or both, into the ground in a uniform manner.

As shown in Fig. 4, rake 25 is carried by a supporting arm 26 that is hinged to a strut 27 secured to the handle H of the device. Strut 27 may, if desired, be provided at its lower end with a rear support wheel 28. The wheel and rake may be swung to or from ground-engaging position by means of the construction shown.

Seeds, such as tobacco seed, are extremely expensive. It is therefore important that the seed be applied to a seed-bed without loss to the wind. It is also important that the seed be uniformly distributed in the seed-bed. If the seed is not uniformly distributed in the bed and the seed become bunched or balled in various places in the bed, there is danger that the bunched seed will mold. If mold develops in the seed-bed it may spread to the entire seed-bed, and destroy the same.

In the past, it has been the practice to rake tobacco seed beds by hand in a more or less indiscriminate manner. Raking by hand has also resulted in the bunching or balling up of the seed. In beds so raked, mold has developed and destroyed the bed. By employing a rake located as shown in the drawings, the seed-bed surface is raked in the same direction in which the seed is deposited on the bed surface. It will be observed by inspection of Fig. 1 that the seed will be deposited in straight, parallel rows in the seed bed. The tines of the rake are so faced that they will rake the bed surface along lines parallel to the rows of seed. The danger of balling or bunching of the seed from raking is therefore reduced to a minimum.

By providing a fertilizer spreader, such as shown at 17 in Fig. 5, constructed in substantially the same manner as the seed spreader, the fertilizer will be uniformly deposited close to the rows of seed so that the fertilizer will be close to the seed. Rake 25 will function to cover uniformly both the seed and the fertilizer.

From the above description, it will be apparent to those skilled in this art, that various modifications may be made in the details of construction of the component parts of the device, without departing from either the spirit or the scope of the invention.

Therefore, what is claimed as new and desired to be secured by Letters Patent is:

A spreader for minute particulate material such as tobacco seed which comprises an elongated trough-like member having ground engaging wheels at the ends thereof, a shaft extending through said trough and connected to said wheels to rotate therewith, spaced blocks mounted in the bottom of said trough-like member, the lower walls of said blocks fitting against the bottom of said member, adjacent ends of the blocks terminating in faces which slope downwardly and toward each other to form a space of truncated V-shape therebetween, there being an opening in the bottom of the trough-like member midway between the ends of the blocks, said shaft having a disk-like agitator disposed on the shaft above the discharge opening and being secured to the shaft to rotate therewith, the agitator comprising a flat central disk portion and integral lugs at the peripheral edge of the disk and extending at an angle to the flat central disk portion, each lug having a leading edge at the plane of the disc and a trailing portion projecting outwardly and circumferentially thereof, alternate lugs projecting from opposite sides of the disk, whereby particulate material in said trough-like member flows down said space along the sides of the agitator as the spreader is propelled on the ground and the lugs throw material against the adjacent faces of the blocks, the agitator being spaced from the blocks and from the bottom of the trough-like member, whereby the material passes between the agitator and the blocks to be discharged through the opening.

References Cited in the file of this patent

UNITED STATES PATENTS

| Number | Name | Date |
| --- | --- | --- |
| Re. 1,166 | Smith | Apr. 2, 1861 |
| 29,897 | Mason | Sept. 4, 1860 |
| 201,508 | Doty | Mar. 19, 1878 |
| 228,913 | Mann | June 15, 1880 |
| 1,132,401 | Stanton | Mar. 16, 1915 |
| 2,193,253 | Masters | Mar. 12, 1940 |

FOREIGN PATENTS

| Number | Country | Date |
| --- | --- | --- |
| 5,871 | Denmark | Aug. 17, 1903 |
| 97,591 | Germany | June 17, 1898 |
| 604,871 | Great Britain | July 12, 1948 |
| 614,752 | Great Britain | Dec. 22, 1948 |